United States Patent Office 3,629,153
Patented Dec. 21, 1971

3,629,153
PROCESS FOR PREPARING ALKALIZED ALUMINA
James N. Pryor, Baltimore, Md., assignor to
W. R. Grace & Co., New York, N.Y.
No Drawing. Continuation-in-part of application Ser. No. 640,796, May 24, 1967. This application Feb. 12, 1969, Ser. No. 798,797
Int. Cl. B01j 11/06
U.S. Cl. 252—463
17 Claims

ABSTRACT OF THE DISCLOSURE

A process is provided for preparing an alkalized alumina solid adsorbent by reacting sodium aluminate with either ammonium carbonate or carbon dioxide to produce dawsonite [$NaAl(CO_3)(OH)_2$ or $KAl(CO_3)(OH)_2$], and optionally heating the dawsonite to convert it to an alkalized alumina comprising substantially $Al_2O_3$ and an alkali metal.

---

This application is a continuation in part of Ser. No. 640,796, filed May 24, 1967 now abandoned. This application relates to the preparation of alkalized alumina. More particularly, it relates to a process for preparing an improved alkalized alumina composition by preparing dawsonite [$NaAl(CO_3)(OH)_2$], and then converting the dawsonite to alkalized alumina.

Alkalized alumina is a well known adsorbent material which is particularly useful in the adsorption of water vapor, hydrogen sulfide ($H_2S$), sulphur dioxide ($SO_2$) and other acidic-type gases. These alkalized alumina adsobents generally comprise a mixture of alumina ($Al_2O_3$) and an alkali metal oxide, such as sodium oxide ($Na_2O$) or potassium oxide ($K_2O$).

Various methods have been proposed for the preparation of alkalized alumina adsorbents. For example, Bienstock et al. in U.S. Pat. No. 2,992,884 suggests the reaction of aluminum sulfate [$Al_2(SO_4)_3 \cdot 18H_2O$] with sodium or potassium carbonate to produce a reaction product which can be converted to an activated alkalized alumina by elevated temperature drying in the presence of oxygen, followed by heating in a hydrogen atmosphere.

It is an object of the present invention to provide an improved method for preparing dawsonite.

It is another object of the present invention to provide a new and improved process for the production of alkalized alumina which has a fibrous-type grain structure and excellent adsorption properties.

Another object of the present invention is to provide a process for the production of an alkalized alumina adsorbent by preparing dawsonite and converting it to an alkalized alumina having the excellent adsorption properties incident to that structure.

Still another object of the present invention is to provide a process for the production of an alkalized alumina adsorbent material which has highly efficient adsorption properties for the removal of water vapor, hydrogen sulfide, sulphur dioxide and similar impurities from exhaust gas streams.

Additional objects and advantages of the invention will be set forth in part in the description or may be learned by practice of the invention, the objects and advantages being realized and attained by means of the instrumentalities and combinations particularly pointed out in the appended claims.

To achieve the foregoing objects and in accordance with its purpose, as embodied and broadly described, the alkalized alumina production process of this invention comprises reacting sodium aluminate with a compound selected from the group consisting of ammonium carbonate and carbon dioxide to form dawsonite [$NaAl(CO_3)(OH)_2$]. Subsequently, the dawsonite may be heated at an elevated temperature to convert it to a granular alkalized alumina adsorbent comprising substantially alumina ($Al_2O_3$) and an alkali metal oxide.

The invention consists in the novel processes, methods, combinations and improvements shown and described. It is to be understood that both the foregoing general description and the following detailed description are exemplary and explanatory but are not restrictive of the invention.

In accordance with the invention, an alkali metal aluminate is reacted with either ammonium carbonate or carbon dioxide to form dawsonite. The alkali metal aluminate can be preformed by the reaction of an alkali metal hydroxide with alumina; or the alkali metal hydroxide, the alumina and the carbonate compound can all be mixed together to produce the dawsonite directly, with the alkali metal aluminate being formed in the reaction mixture and then converted to dawsonite.

It is preferred to pre-form the alkali metal aluminate and then react it with the ammonium carbonate or carbon dioxide in a separate process step. Sodium aluminate is preferred over other alkali metal aluminate reactants, such as potassium aluminate, and thus it is preferred to prepare the alkali metal aluminate from sodium hydroxide and alumina.

The alumina reactant can be used in the form of powder, such as C-31 alumina powder produced by Alcoa, or can be in the form of hydrated alumina [i.e., amorphous $Al(OH)_3$]. It is preferred to add the granular or hydrated alumina to a hot, or even boiling, solution of sodium hydroxide to form sodium aluminate in accordance with the following reaction:

(I) $2NaOH + Al_2O_3 \rightarrow 2NaAlO_2 + H_2O$

It will, of course, be appreciated that potassium hydroxide can be substituted for sodium hydroxide in the above reaction. The resultant product would then be potassium aluminate, and the final product would then be the potassium counterpart of dawsonite.

In accordance with the present invention, the alkali metal aluminate is reacted with either ammonium carbonate (Equation II) or carbon dioxide (Equation III) to produce dawsonite, which can be converted to an improved alkalized alumina composition by heating. These dawsonite production reactions are shown in the following equations:

(II)
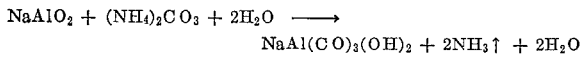
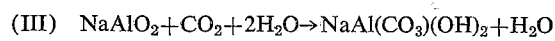

(III) $NaAlO_2 + CO_2 + 2H_2O \rightarrow NaAl(CO_3)(OH)_2 + H_2O$

As shown by the foregoing equations, the dawsonite production reaction is carried out in the presence of water. The reaction is preferably carried out by reacting an aqueous sodium aluminate solution with an excess of $CO_2$ or ammonium carbonate.

The ammonium carbonate can be added to the sodium aluminate solution as an aqueous solution, or in the form of solid ammonium carbonate granules. The reaction with carbon dioxide is preferably carried out by adding an excess of carbon dioxide gas or Dry Ice to the aqueous sodium aluminate solution.

In a particularly preferred practice of the invention dawsonite is prepared by reacting an aqueous solution of sodium aluminate with carbon dioxide gas while maintaining a pH of 9.0 to 10.0 within the reaction mixture.

In a typical practice of the invention using gaseous carbon dioxide and commercial grade sodium aluminate, sodium aluminate is dissolved in water to form a solution containing about 0.25 to 0.75 and preferably about 0.50 mole of sodium aluminate per liter. This solution is continuously pumped to a reactor along with a continuous stream of gaseous carbon dioxide. The rate of combining the sodium aluminate solution with the carbon dioxide is such that the pH of the reaction mixture is maintained within the range of 9.0 to 10.0 and preferably within 9.2 to 9.8.

Satisfactory results are obtained if the reaction is conducted at atmospheric pressure and ambient temperatures of about 50 to 100° F. Under these conditions the reactants react substantially immediately to form an aqueous slurry of dawsonite. The dawsonite is recovered by filtration or decantation.

The product prepared by way of the present procedure is found to possess a crystalline structure which is characteristic of dawsonite as evidenced by X-ray analysis. When attempts are made to produce dawsonite using a pH outside of the herein specified range, substantially none of the desired dawsonite structure is found. For example, a pH of about 11 will produce a product characterized as B-alumina trihydrate, whereas a pH of about 8 will produce a product which is primarily amorphous.

In one particularly advantageous embodiment of the present invention excess alumina is added to the dawsonite containing reaction mixture, so that the product contains unreacted alumina dispersed throughout the dawsonite product. It is possible by this addition of excess alumina to increase the percentage of alumina in the final adsorbent product to amounts in excess of 70%, if desired. Compositions containing such high percentages of alumina are particularly desirable and advantageous in certain $SO_2$ adsorption usages. Conversion of this dawsonite-alumina product to alkalized alumina yields a product having a desirably high $Al_2O_3$ content.

In accordance with the process of the present invention, the dawsonite is converted to alkalized alumina (substantially comprising $Al_2O_3$ and an alkali metal oxide) by heating the dawsonite at an elevated temperature. This conversion of dawsonite to alkalized alumina is generally illustrated by the following equation:

(IV)

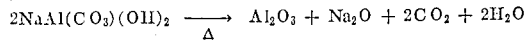
$$2NaAl(CO_3)(OH)_2 \xrightarrow{\Delta} Al_2O_3 + Na_2O + 2CO_2 + 2H_2O$$

Preferably, the heating of the dawsonite takes place in two stages. In such a process the dawsonite is first heated to a temperature of at least about 250° F. to achieve the dehydration indicated in Equation IV. This initial heating can suitably be carried out in a conventional hot air oven, and is preferably carried out at temperatures of about 250 to 300° F. This heating procedure vaporizes substantial amounts of water and any ammonia which was not removed from the reaction mixture during the dawsonite formation reaction. If desired the material may be formed into pellets at this point. Subsequently, the substantially dehydrated dawsonite is heated a temperature in excess of about 400° to as high as about 2000° F. for a period sufficient to achieve substantialy conversion of the dawsonite to the desired alkalized alumina. This high temperature treatment may take place while the dehydrated material is being used as an absorber under the required elevated temperatures such as are encountered in stack-gas treatment.

The final alkalized alumina absorbent produced by the foregoing process is characterized by the X-ray crystal pattern associated with an amorphous type structure.

When formed the final product may be used as an absorbent in the form of a moving bed, a fluidized bed, a fixed bed or any other solid absorbent techniques well known to those skilled in the art.

For a clearer understanding of the invention, specific examples of it are set forth below. These examples are merely illustrative and are not to be understood as limiting the scope and underlying principles of the invention in any way. All parts and percentages referred to herein are by weight unless otherwise specifically indicated.

EXAMPLE 1

A sodium aluminate solution is prepared by mixing 785 gm. of alumina trihydrate [$Al(OH)_3$] with 400 gm. of a 50% aqueous solution of sodium hydroxide. The resulting slurry is heated at about 195° F. to produce a dissolution of the hydrate, and a solution of 960 gm. of ammonium carbonate in 2500 ml. of water is then added to the sodium aluminate solution with vigorous stirring. A precipitate is immediately formed, and ammonia gas is evolved from the reaction mixture. The reaction mixture is mechanically stirred and maintained at a temperature of about 195 to 205° F. for one hour. The resultant product is allowed to cool to room temperature, transferred to trays, and dried in the presence of air in an oven at 250 to 275° F. for 16 hours.

The product is identified by X-ray diffraction as dawsonite [$NaAl(CO_3)(OH)_2$]. The composition of the dawsonite product at 400° F. is as follows (all values are in weight percent and calculated on a dry basis):

| | Percent |
|---|---|
| $Al_2O_3$ | 35.50 |
| $Na_2O$ | 22.60 |
| $NH_3$ | 0.07 |
| $CO_2$ | Balance. |

The product is granular having a surface area (B.E.T.) of 71 m.$^2$gm., a pore volume of 0.35 cm.$^3$/gm., and a pore diameter of 197 A.

The dried above product is then heated at 1750° F. for 60 minutes, and yields total volatiles of 19.31%. The resulting alkalized alumina product has the following composition (in weight percent, calculated on a dry basis):

| | Percent |
|---|---|
| $Al_2O_3$ | 62.4 |
| $Na_2O$ | 37.6 |

EXAMPLE 2

A 750 gm. sample of alumina powder (C-31 alumina sold by Alcoa) is dissolved in 440 gm. of a boiling 50% aqueous solution of sodium hydroxide. A solution of 960 gm. of ammonium carbonate in 2500 ml. of water at room temperature is added to the hot sodium aluminate solution with constant agitation. The agitation is continued for 1 hour with the reaction temperature being maintained at about 195–205° F. The resulting product is then dried at 275° F. in an oven in the presence of air. When formed into pellets a good granular product is obtained, having a crushing strength range of 6 to 15 pounds; an average crushing strength of 10 pounds; a packed density of 0.75 gm./cm.$^3$; a poured density of 0.68 gm./cm.$^3$; and the X-ray crystal pattern of dawsonite.

EXAMPLE 3

In this example, a hot sodium aluminate solution is prepared in the manner described in Example 2 and 960 gm. of solid ammonium carbonate powder are slowly added to it. The dawsonite product obtained is substantially similar to that of Example 2.

EXAMPLE 4

A hot sodium aluminate solution is again prepared in the manner described in Example 2. An excess of Dry Ice is added to the aluminate solution in the reaction vessel, and the reaction mixture is heated to boiling. The dawsonite product produced in this example is substantially similar to that produced in Example 2.

EXAMPLE 5

A 306 gm. sample of powdered alumina (C-31, Alcoa) is dissolved in a boiling solution of 70 gm. of NaOH in 200 ml. of water. The resulting hot sodium aluminate solution is mixed with a solution of 375 gm. of ammonium carbonate in 1000 ml. of water, with heat and agitation.

A sample of hydrated alumina is prepared by dissolving 830 gm. of aluminum nitrate in 1000 ml. of water and adding 500 ml. of 28% ammonium hydroxide solution to precipitate $Al(OH)_3$.

The aluminum hydroxide precipitate is added to the reaction mixture of sodium aluminate and ammonium carbonate, and the entire mixture is agitated for an additional 30 minutes. The reaction product is then dried in an oven at 300° F. to yield a product having the X-ray characteristics of dawsonite.

When this product is heated at 1750° F. for 60 minutes it yields a total volatiles content of 47.71% and an alkalized alumina product having the following composition:

| | Percent |
|---|---|
| $Al_2O_3$ | 72.54 |
| $Na_2O$ | 24.80 |

The product has a surface area (B.E.T.) of 87 m.²/gm., a pore volume of 0.17 cc./gm., and a pore diameter of 78 A.

EXAMPLE 6

A 660 cc. heel of dawsonite reaction slurry (prepared by a preceding similar run) was placed in a 2200 cc. conical reactor. A stream of 0.5 molar sodium aluminate solution, molar ratio $Na_2O/Al_2O_3 = 1.078$, was pumped into the bottom of the reactor while gaseous carbon dioxide was charged via another inlet into the bottom of the reactor. The flows of the reactants were controlled such that the slurry pH was held at a pH of 9.2 to 9.8. The slurry was continuously removed from the reactor for a period of 3 hours. A total of 10 l. of slurry was obtained in this time. The slurry was filtered and dried at 350° F. X-ray analysis indicated a very good dawsonite product was formed.

EXAMPLE 7

To determine the criticality of the presently defined pH range of about 9.0 to 10.0, two runs were conducted using the same procedure and apparatus set forth in Example 6, however, the reactant streams were controlled to produce a reaction slurry pH of 8.4 and 11.1 respectively. Where the pH was held at pH 8.4 an essentially amorphous product was obtained. In the run conducted at pH 11.1, a product identified as B-alumina trihydrate was formed.

The invention in its broader aspects is not limited to the specific details shown and described, but departures may be made from such details within the scope of the accompanying claims without departing from the principles of the invention and without sacrificing its chief advantages.

What is claimed is:

1. A process for the production of alkalized alumina, which comprises reacting an alkali metal aluminate with a compound selected from the group consisting of ammonium carbonate and carbon dioxide in an aqueous solution while maintaining a pH of 9–10 so as to form dawsonite, and heating the dawsonite at an elevated temperature in excess of about 400° F. to convert it to alkalized alumina comprising substantially $Al_2O_3$ and an alkali metal oxide.

2. The process of claim 1 in which the alkali metal aluminate is sodium aluminate and the alkali metal oxide is sodium oxide.

3. The process of claim 2 in which the sodium aluminate is reacted with ammonium carbonate.

4. The process of claim 3 in which an aqueous sodium aluminate solution is reacted with an excess of an aqueous solution of ammonium carbonate.

5. The process of claim 4 in which the reaction between the sodium aluminate solution and the ammonium carbonate solution is carried out at an elevated temperature.

6. The process of claim 3 in which solid ammonium carbonate is added to an aqueous solution of sodium aluminate.

7. The process of claim 2 in which the sodium aluminate is prepared by reacting sodium hydroxide with amorphous $Al(OH)_3$.

8. The process of claim 2 in which the sodium aluminate is reacted with gaseous carbon dioxide at a pH of 9.0 to 10.0.

9. The process of claim 2 in which the carbon dioxide is added in the form of Dry Ice.

10. The process of claim 1 in which an excess of alumina is added to the reaction mixture so that excess alumina is dispersed throughout the final alkalized alumina product.

11. The process of claim 10 in which the dawsonite is prepared by adding excess $Al(OH)_3$ to a mixture of sodium aluminate and ammonium carbonate at an elevated temperature.

12. The process of claim 13 in which the dawsonite is converted to activated alumina by heating it at a temperature of at least about 250° F.

13. A method for preparing dawsonite which comprises:
    (a) continuously reacting a stream of sodium aluminate solution with a stream of gaseous carbon dioxide to form a reaction mixture slurry;
    (b) controlling said streams to maintain a pH of about 9.0 to 10.0 in said slurry; and
    (c) recovering dawsonite from said slurry.

14. The method of claim 13 wherein said pH is maintained within a range of 9.2 to 9.8.

15. The method of claim 13 wherein said sodium aluminate solution contains about 0.5 mole sodium aluminate per liter.

16. The method of claim 13 conducted at a temperature of 50 to 100° F.

17. The method of claim 13 conducted at essentially atmospheric pressure.

References Cited

UNITED STATES PATENTS

| 3,459,502 | 8/1969 | Van Nordstrand | 23—143 |
| 3,389,975 | 6/1968 | Van Nordstrand | 23—315 |

FOREIGN PATENTS

| 854,946 | 9/1952 | Germany. |

DANIEL E. WYMAN, Primary Examiner

P. M. FRENCH, Assistant Examiner